I. Judson,
Dressing Stares.
No. 211.
Reissued Mar. 9. 1852.
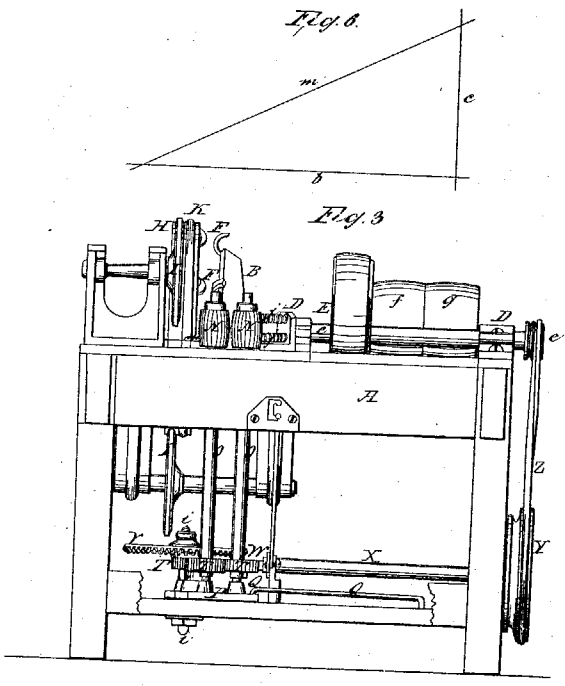
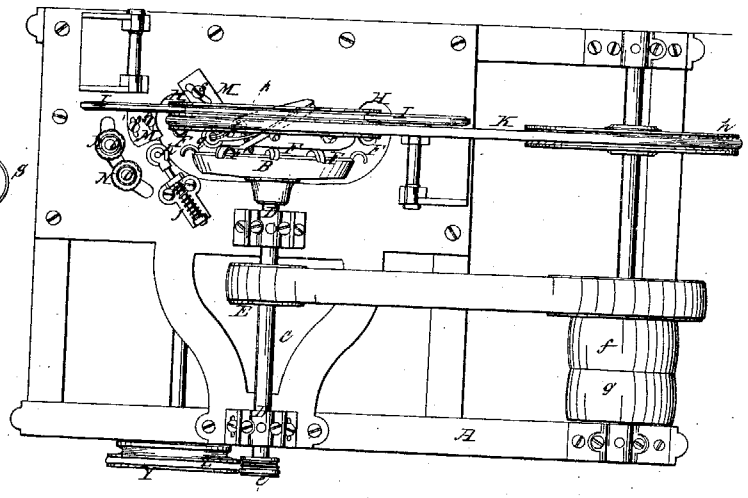
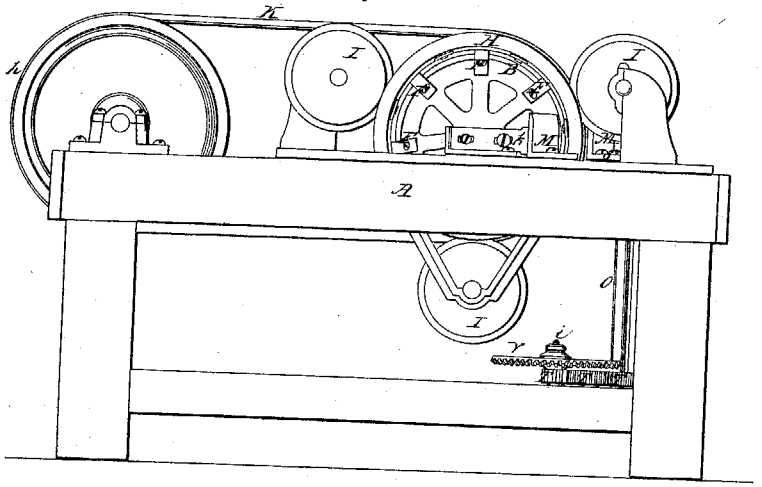
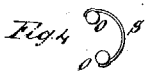
A.M. PHOTO-LITHO. CO. N.Y. (OSBORNE'S PROCESS.)

UNITED STATES PATENT OFFICE.

ISAAC JUDSON, OF NEW HAVEN, CONNECTICUT.

IMPROVEMENT IN MACHINERY FOR DRESSING STAVES.

Specification forming part of Letters Patent No. 5,099, dated May 1, 1847; Reissue No. 211, dated March 9, 1852.

*To all whom it may concern:*

Be it known that I, ISAAC JUDSON, of the city and county of New Haven, and State of Connecticut, have invented a new and useful Improvement in Machinery for Dressing Staves; and I do hereby give the following as a full and exact description of said improvement, reference being had to the annexed drawings, making part of this specification.

Figure 1 is a plan or view of the top of the machine. Fig. 2 is an elevation or view of the side of the machine. Fig. 3 is an end elevation or view of the end of the machine. Fig. 4 is a sectional view of the shafts of the feed-rolls, showing the spring that embraces the shafts and keeps the rolls against the stave. Fig. 5 represents a flat cutter. Fig. 6 is a diagram showing the figures formed by the base and axis of the wheel, intersected by the line of the guides for the stave.

Similar letters in the several figures refer to corresponding parts.

A represents the frame. This is made of any suitable form, size, and material for the purpose intended.

B is a circular revolving wheel, ring, or plate for carrying the cutters that cut and form the concave side of the stave. C is the shaft to which said wheel is affixed. D are the boxes in which said shaft C turns. E is a pulley on said shaft C, around which is passed an endless band leading to a pulley on the driving-shaft.

F are the cutters for cutting, forming, and dressing the concave side of the stave to the required curvature and smoothness. These cutters are made of any suitable form or material, and are secured to the face of the wheel opposite to the revolving wing (hereinafter described) and next to or against the perimeter thereof. The said cutters may be of the gouge form (as represented in Fig. 1) or of the form of a parallelogram with one corner cut off, as shown at R, Fig. 5, in which G represents an oblong mortise in the same through which a screw-bolt is passed that secures the said cutter to the wheel. This form of cutter is preferred. Its position on the wheel may be changed at pleasure, so as to correspond with any change of position of the stave for producing the various curvatures of the inner side of the stave. The gouge-shaped cutter represented in Fig. 1 is secured to the wheel in the same way. This cutter is found not to answer so good a purpose in all cases as some other forms that have been tried, but to remove the surplus material it answers very well. The cutters, however, may be made of any required form, and may be secured to the wheel in any convenient way and at the required angle for producing the desired result.

H is a revolving ring or rim for carrying the cutters that cut, form, and shave the convex side of the stave. The axis of the ring and wheel coincide, but their vertical planes do not. They are, however, parallel. The ring is set back from the wheel the required distance to form the necessary space between them for the passage of the staves obliquely between the cutters at any required angle with the planes of the ring and wheel. The ring has no axle or shaft. It is supported by and turns against the peripheries of a number of anti-friction wheels, I, whose axles turn in boxes connected with castings fixed to the frame. The ring is sustained upon the peripheries of these anti-friction wheels by means of a circular groove made in the periphery of the ring in which the said anti-friction wheels turn, and which prevent the ring from having any side motion during its revolving motion. It is turned by means of a flat endless band passed around it and leading to the driving-power, or by means of an endless round band, K, let into a corresponding groove made in the periphery of the ring and a similar groove made in a pulley, *h*, on the driving-shaft. The cutters of this ring are made and arranged in the same manner as those above described for the wheel.

M M are two short right-angled rests or guides fastened to the frame by means of segment-mortises and set-screws. The mortises are made in the horizontal portions of the rests or guides. The vertical portions constitute the guides, against which the stave which is to be dressed is propelled. The faces of these guides are in a straight oblique line. This line, when continued until it intersects a line drawn through the axis of the wheel and a line drawn through the base of the wheel, will form a hypotenuse of a right-angled triangle, or the side of a section of a cone, the base of the triangle corresponding with the base of the wheel and the perpendicular corresponding with the axis of the wheel. In Fig. 6 these lines are represented at *m b c*, *m* being the hypotenuse, *b* the base, and *c* the perpendicular. In dressing staves for casks of various diameters the line of the guides must be raised. To cut the stave the segment of a large circle the line of the guides must be changed so as to diminish its angle with the base. A contrary result takes place when the stave is to be dressed for a smaller cask. This is effected by simply unscrewing the set-screws *s* and moving the guides to the required positions and again making them fast. The staves are propelled forward to the cutters by means of two feed rolls, N N, whose axes are nearly parallel and vertical, and between which the stave is placed. These rolls are above the frame, and their shafts O O extend down through the frame to an adjustable segment-plate, P, turning on a center, *i*, in the frame, in which plate the lower ends of the shafts are stepped or placed and adjusted or moved to the right or left in the arc of a circle by moving said segment-plate, which is held in any required position by a catch, Q, attached to the frame and dropped into a notch or hole in the segment-plate. The upper ends of the shafts are loose, and have a swing motion to the right and left, and are borne toward each other by a spring, S, which embraces the shafts. The shafts are thus placed for the purpose of allowing the feed-rolls to accommodate themselves to the crooked forms of the staves to be dressed. The shafts are turned by means of cog-wheels $T'$ $T^2$, fixed to them, which are geared together and to an intermediate cog-wheel, $T^3$, which is geared with a pinion, $T^4$, on a vertical axle, *i*, on which there turns a large bevel-wheel, V, that works into a small bevel-pinion, W, on a horizontal shaft, X, turning in suitable boxes in the frame, there being on said shaft a pulley, Y, around which is placed a cross-band, Z, leading around a pulley, *e*, on the axle *c* of the wheel of cutters.

*f* is a fast pulley on the main or driving shaft. *g* is a loose pulley on said shaft of the usual form, arrangement, and operation.

*p* and *q* are two anti-friction rollers for bearing the stave against the guides.

*j* and *k* are springs for extending the rollers outward toward the guides. These rollers and springs act each independently of the other. When a stave is inserted between the guides and rollers, the springs *j* and *k* contract to allow the rollers to recede. In Fig. 1 the rollers *p* and *q* are represented as extended so as nearly to touch the guides, no stave being represented in the machine.

When a stave is to be dressed, it is placed edgewise upon the frame, with one end between the feed-rolls N. The machine being put in motion the feed-rolls propel the stave between the guides and bearing-rollers to the cutters on the opposing faces of the wheel and ring, and in passing between the cutters it is shaped and dressed smooth—concave on one side and convex on the opposite side. Another stave, being inserted between the feed-rolls, and propelled forward in the same manner, strikes against the stave next before it and propels it through the space between the wheel and ring. In this manner the operation of the machine is kept up.

The stave or other piece of wood may be dressed to a concave or convex form on one side only by introducing it in an oblique direction to either the wheel or ring of cutters used singly.

The object of my improvement is the dressing of the convex and concave sides of staves to any required curvature by one continued simultaneous operation. In accomplishing this result it will be noted—

First. That two revolving rings or wheels having cutters on their opposing surfaces, or sides next each other, for shaving the stave transversely and simultaneously on its inner and outer sides, are arranged and combined in such manner that the stave can pass obliquely between them at any required angle with the planes of the wheels or rings, and that the cross-sections of the stave produced will be the segments of a circle whose diameter is greater than the diameter of the wheels or rings.

Second. That the curve of the stave can be varied at pleasure according to the different sizes of the casks for which the staves are intended by changing the relative position of the guides and feed-rolls and the cutters on the parallel rings or wheels. The effect and operation of this may be illustrated as follows: The plane of the rings or wheels forms the base of a right-angled triangle, or section of a cone. The axes of the rings or wheels form the perpendicular of a right-angled triangle or the axes of a cone. The straight line in which the stave moves toward the cutters forms the hypotenuse of a right-angled triangle, or the inclined side of the cone. This last-mentioned line (represented in line *m* in Fig. 6) the operator, by varying the relative position of the guides and feed-rolls and of the cutters, can change at pleasure, and thus produce a corresponding change in the curvature of the stave, the angle of the side of the cone with its base being increased when the degree of the curvature of the stave is to be decreased, and diminished when the degree of the curvature of the stave is to be increased.

Third. That during the operation that portion of the stave, the immediate vicinity of which is being cut, is held firmly in its place by two short rests or guides and their corresponding rollers, while the remaining portions of the stave, as well that (if any) which has been already shaved as that which has not, is left wholly unconfined and at liberty to accommodate its position to whatever crooks or windings may exist in it. This improvement I regard as essential to success in dressing rived staves by machinery. It enables the stave to assume, free from all constraint, whatever position, lateral or vertical, its natural crooks or windings indicate, and leaves it at liberty to present itself to the cutting-wheels or rings with such regard to its crooks and windings that the cutters, acting in a line parallel with the natural grain of the wood, shave off such parts, and such parts only, of the stave as its configuration requires to reduce it to the desired form.

Fourth. That as auxiliary to the last-mentioned improvement, and with a view the more perfectly to secure the result therein contemplated, the feed-rollers are made to swing to the right and left in the arc of a circle, for the purpose of accommodating themselves to the irregular shapes of the pieces of wood to be dressed; and with the same object in view, the two anti-friction rollers which hold the stave against the guides or rests are moved by springs acting wholly independent of each other, so that both the upper and lower edges of the stave, however diverse in thickness, are held with equal firmness against the guides or rests, while at the same time the cutters are thus made to act upon either edge of the timber, just in proportion to the extent its relative thickness may require.

What I claim as my invention, and desire to secure by Letters Patent, is—

1. The arrangement of the wheel and ring of cutters for the purposes and in the manner substantially as hereinbefore described.

2. The holding of the stave firmly in position to be dressed in the immediate vicinity of that portion which is being cut, while all the other portions are left at full liberty to assume whatever position its configuration may indicate, for the purposes and in the manner substantially as hereinbefore described.

3. The employment of the two independent spring-rollers *p* and *q* or their equivalent, acting with equal force upon each of the edges of the stave irrespective of their relative thickness, in combination with the guides and the cutters, as described.

ISAAC JUDSON.

Witnesses:

DENNIS KIMBERLY,
JNO. S. BEACH.